United States Patent [19]
Fraser et al.

[11] Patent Number: 5,329,215
[45] Date of Patent: Jul. 12, 1994

[54] APPARATUS AND METHOD FOR DRIVING A LEADSCREW

[75] Inventors: John W. Fraser, Dayton; Curtis Woods, Centerville, both of Ohio

[73] Assignee: Ohio Electronic Engravers, Inc., Dayton, Ohio

[21] Appl. No.: 23,060

[22] Filed: Feb. 25, 1993

[51] Int. Cl.[5] .............................................. G05D 3/18
[52] U.S. Cl. .................................... 318/603; 318/632
[58] Field of Search ............... 318/560, 569, 570, 571, 318/572, 573, 600, 603, 604, 605, 618, 625, 628, 630, 632, 654, 661, 687, 41, 51, 66, 67, 68, 85; 33/18.1, 21.1, 23.01; 409/85

[56] References Cited
U.S. PATENT DOCUMENTS

| | | |
|---|---|---|
| 3,770,888 | 11/1973 | de Vos et al. |
| 3,843,875 | 10/1974 | Goodstal et al. |
| 3,857,025 | 12/1974 | English et al. ................. 318/568 X |
| 4,079,235 | 3/1978 | Froyd et al. ....................... 364/107 |
| 4,112,493 | 9/1978 | Roch et al. ...................... 318/625 X |
| 4,126,821 | 11/1978 | Cannon ............................... 318/696 |
| 4,354,196 | 10/1982 | Neumann et al. |
| 4,437,150 | 3/1984 | Dahlgren, Jr. et al. |
| 4,603,391 | 7/1986 | Inoue et al. ......................... 364/474 |
| 4,678,976 | 7/1987 | Inoue .................................. 318/577 |
| 4,834,595 | 5/1989 | Cacciotti . |
| 5,059,089 | 10/1991 | Kocaoglan . |

OTHER PUBLICATIONS

"Dätwyler", Max Daetwyler Corporation, 13420 West Reese Blvd., Huntersville, N.C. 28078, undated brochure.

"Twin-Pilot", Maschinenfabrik Kaspar Walter GmbH & Co. KG, Plinganserstrasse 22, 8000 Munchen 70, Germany, undated brochure.

American Machinist, Feb. 1993 Magazine Article, Laser Technology, "Getting Better Accuracy With Non-Precision Ball Screws", pp. 50,51.

Primary Examiner—Bentsu Ro
Attorney, Agent, or Firm—Biebel & French

[57] ABSTRACT

A leadscrew driving arrangement which is corrected to eliminate the effect of pitch errors. The leadscrew is mapped to create a table of differences between the leadscrew angular position and the corresponding angular position of a perfect leadscrew which has been advanced the same axial distance. The differences are used to create a correction table which is stored in a PROM. During operation of the leadscrew, the correction table is used to adjust the leadscrew driving signal.

17 Claims, 5 Drawing Sheets

APPARATUS AND METHOD FOR DRIVING A LEADSCREW

BACKGROUND OF THE INVENTION

This invention relates to the field of leadscrew driving. It has particular application to drivers for leadscrews which are installed in high resolution engraving systems. In such a system an engraving stylus may be mounted on a carriage which is carried by a leadscrew along a linear path in engraving contact with the surface of a rotating cylinder such as a gravure printing cylinder. The invention also has application to engraving systems wherein the cutting is performed by a high energy laser.

Leadscrews are provided with a long helical thread which passes through a threaded nut. The leadscrew is supported in a manner such that it is free to rotate but without any axial movement. The nut is fixed against rotation but is free to move axially along the leadscrew. A working head is secured to the nut, so that when the leadscrew rotates, the head moves in the axial direction. The screw may be driven by a motor assembly which responds to electronic pulses and which rotates through a defined angular increment for each applied pulse.

When used in a precision application of the type contemplated for this invention, a leadscrew must have an extremely accurate pitch. Small pitch errors in the leadscrew produce corresponding errors in the position of the working head relative to the workpiece. Sometimes the errors are cyclic in nature, and other times they are substantially local. The errors may occur abruptly or may accumulate gradually. In any event, they can cause production of an unacceptable workpiece.

Prior art engraving systems have used the most accurate (and expensive) leadscrews available and have simply tolerated errors which could not be machined out of the leadscrews. The use of shaft angle feedback does not solve the leadscrew pitch problem, because the work head location is not a linear function of the shaft angle being measured.

It is therefore seen that there is a need for leadscrew driving apparatus which is able to position a workpiece with improved accuracy. More particularly, there is a need for a leadscrew drive which has a linear relationship between a commanded net rotation angle of the leadscrew and the responding axial position of a work head.

SUMMARY OF THE INVENTION

In accordance with the present invention a leadscrew for use in a precision application is mapped, preferably with an interferometer to establish the pitch errors for a series of net rotation angles. A table of corresponding incremental corrections is prepared and stored in a memory device. Thereafter the memory device is incorporated into the drive control system for the leadscrew and used for adjusting leadscrew positioning commands.

During the operation of the system a command generator (which may be an external device) generates a raw command signal comprising a series of command pulses which may be regularly timed. The command pulses are generated at the frequency which would be required for controlling the rotation angle of an error free leadscrew. These pulses are applied to a pulse processor and also to a rotation angle counter which keeps track of the net commanded rotation angle of the leadscrew and generates addresses for reading a series of incremental corrections from a memory device. The pulse processor produces an adjusted command signal by applying these incremental corrections to the raw command signal. This corrected command signal is then applied to the drive control system for the leadscrew.

The corrections are applied in a continuous incremental manner with the increment of correction being the smallest increment of motion of the leadscrew driver. In this way the error never becomes greater than the smallest increment of motion. Nor does there need to be any calculation of the correction to be applied, i.e. there is no interpolation or summation of correction data with a desired position. This correction method needs no knowledge of the destination of a move. The corrections are of an increment/decrement nature; there is no error value as such held in the correction table. This reduces the size of the correction table, or, alternatively enables a memory of limited size to store all necessary data for a relatively large number of corrections. The data entries may correct leadscrew errors arising from drunkenness, out-of-roundness, indicated runout from bends or mount non-concentricities as well as the more typical lead error.

Not every command pulse need be adjusted. Given a leadscrew error accumulation slope of 1/N, only one out of every N command pulses need be adjusted. This allows the correction table size to be reduced by a factor of approximately N. In the preferred embodiment a 27256 EPROM allows 65536 adjustment locations along the leadscrew. For a leadscrew with a travel of up to 256 inches and a pitch of four turns per inch, there are 64 possible adjustments per revolution of the leadscrew. Errors related to individual rotations of the screw may be corrected.

The correction table is derived from an error table which may be established through measurements made by an interferometer. These measurements may be made on the leadscrew itself or on the system which is driven by the leadscrew. In the latter case the correction table entries may correct system errors arising from other system elements, as well as those attributed to the leadscrew. The correction accuracy of the invention is limited only by the repeatability of the leadscrew motion. Those errors which are the same each time the leadscrew nut passes through a region of the screw will be correctly canceled.

In the preferred embodiment the incremental corrections from the memory device are converted into ADD PULSE and DELETE PULSE signals. When neither ADD PULSE nor DELETE PULSE signals are present, uncorrected raw command pulses are used for driving the leadscrew. An ADD PULSE signal causes an extra pulse to be incorporated into the adjusted command signal, while a DELETE PULSE signal causes blockage of a raw command pulse which otherwise would have been incorporated into the adjusted command signal.

In the motor drive subsystem the command pulses appearing in the adjusted command signal are applied to an UP/DOWN error counter. The error counter also receives position feedback pulses from a shaft encoder connected to the leadscrew and generates a difference count for controlling a leadscrew drive motor, preferably a DC servomotor. Velocity smoothing is provided by a velocity control loop inside the position control loop.

The following detailed description explains the particulars of the preferred embodiment. However it should be understood that other arrangements are feasible. For example, the position counter could be connected to the shaft angle encoder rather than to the source of the raw command pulses. Also, the correction pulses could be applied to the position feedback signal or directly to the position difference count.

It is therefore an object of this invention to improve the axial positioning accuracy of a leadscrew for an engraving system.

It is another object of the invention to correct a sequence of leadscrew driving pulses to obtain a smooth, controlled velocity response of a work head.

Other and further objects and advantages of the invention will be apparent from the following description, the attached drawing and the appended claims.

DESCRIPTION OF THE PREFERRED EMBODIMENT

Figure 1:
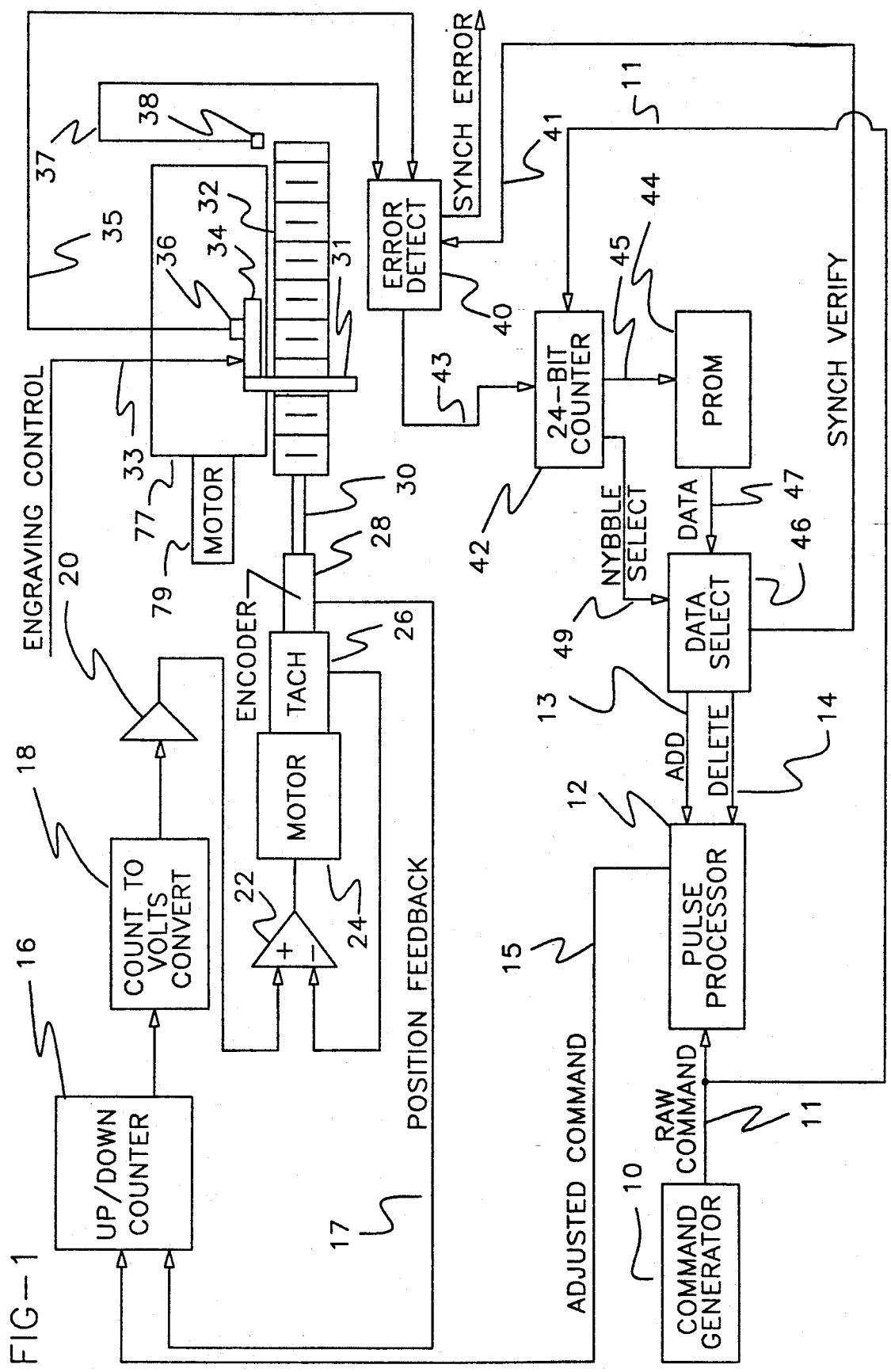
FIG. 1 is a block diagram of a leadscrew control system in accordance with the present invention.

A control system for driving a leadscrew 32 in accordance with this invention may be configured as generally illustrated in FIG. 1. Thus a reference signal in the form of a raw command signal may be produced by a command generator 10 and carried on a line 11. The raw command signal comprises a train of pulses which are processed by a pulse processor 12 to create an adjusted command signal on line 15. The adjusted command signal then is used for controlling the rotation of leadscrew 32 inside a threaded nut 31 which in turn is fixed to a work head 34. Pulse processor 12 adjusts the raw command signal so as to compensate for errors in the pitch angle of the leadscrew. As a consequence, there is a linear relation between the net rotation angle specified by the raw command and the resulting axial position of work head 34. In this regard it should be understood that the net rotation angle of leadscrew 32 is the total rotation occurring after a predetermined number of pulses from command generator 10 have been corrected by pulse processor 12.

The adjusted command signal is applied via a line 15 to a position comparator in the form of an UP/DOWN counter 16. Counter 16 counts command pulses on line 15 and subtracts feedback pulses generated on line 17 by a shaft angle encoder 28. The resulting accumulated count is a position error in a digital format. This position error is used for driving the leadscrew motor. It should be appreciated that the position error rapidly settles down to a value which is constant at constant velocity. Therefore the position "error" produces no engraving error. It is merely a steady state lag which is converted into analog form by a digital to analog converter 18.

The analog error is amplified by an amplifier 20. However, amplifier 20 may be replaced by an integrator, so that the position error signal may be reduced to a near zero value while still maintaining a substantial leadscrew driving signal. The amplified position error (or integrated position error) is applied to a differential amplifier 22. The differential amplifier compares the position error with a velocity feedback signal generated by a tachometer 26, amplifies the difference and supplies a driving signal to motor 24. Preferably, motor 24 is a DC servo motor. The system therefore operates as a phase-locked speed controller. However, since phase sensing is accomplished by counter 16 the range of the phase error may be greater than 360° without any loss of counts, even if the system accelerates very rapidly. This is very important because lost pulses accumulate and produce work head registration errors.

It is preferred that error amplifier 20 be provided with a tuning circuit (not illustrated) adapted for modifying the operation of the amplifier as a function of the speed range being signaled by a tachometer 26. Moreover, it is preferred that the tachometer include means for adjusting the amplitude of the tachometer signal so as to avoid saturation of differential amplifier 22 at high speed operation associated with manual slewing. Manual slewing is accomplished by inputs (not illustrated) which provide an alternate source of incoming pulses at an adjustable frequency. The frequency control of the drive pulses allows a ramping action so as to permit the control of both small and large motions.

Motor 24 rotates a shaft 30 attached to leadscrew 32, which may be fitted with a threaded nut 31. Nut 31 supports a work head 34 which may include an engraving stylus. Thus an engraving control signal may be supplied on a line 33 to work head 34. Engraving is carried out against the surface of a rotating cylindrical workpiece 77 driven by another drive motor 79. In the preferred embodiment command generator 10 comprises an encoder mounted on the drive for the work piece 77, so that the raw command pulses are generated in synchronism with the work piece rotation.

The system also includes a 24-bit rotation angle counter 42 connected to line 11 for receiving the raw command signal generated by command generator 10. Counter 42 counts the pulses in the raw command signal to generate a net rotational position signal on address lines 45. As hereinafter described in more detail in connection with FIG. 2, the high 15 bits of the 24-bit count are transmitted directly to PROM 44. A 16th bit is transmitted to a nybble selector 102, so that lines 45 effectively carry a 16-bit address for a table of linearizing corrections stored in PROM 44. These linearizing corrections represent the incremental differences between the net angular rotation of leadscrew 32 and the net angular rotation of a corresponding error-free leadscrew having nut 31 at the same axial position.

The incremental corrections in PROM 44 are tabulated as a function of net angular rotation, so that the signal on line 45 causes PROM 44 to produce data on data lines 47 indicating appropriate corrections for the raw command signal. The corrections on line 47 are decoded by a data select circuit 46 in synchronism with a count received by circuit 46 from counter 42 on line 49.

Data select circuit 46 generates a series of "ADD" pulses on line 13 and a series of "DELETE" pulses on line 14. These pulses are applied to pulse processor 12. For each pulse on line 13, pulse processor 12 adds a pulse to the raw command signal on line 11. For each pulse on line 14, pulse processor 12 deletes a pulse from the raw command signal. Since PROM 44 and multiplexer 102 are addressed by the high order 16 bits of the 24 bit counter, data changes appear on line 47 only once for each 256 feedback pulses on line 17.

The control system of FIG. 1 also includes an error detection circuit 40 for detecting control system failures. The details of operation of error detection circuit 40 are not necessary for an understanding of the present invention. It is sufficient to note at this point that the circuit of block 40 receives a carriage index signal on line 35 which is generated by a sensor 36 positioned for detecting the condition when the work head 34 is at the end of its stroke. Another sensor 38 senses a mark on leadscrew 32 each time the leadscrew reaches top dead center in its rotation cycle. Data select circuit 46 transmits a synchronization verification signal on line 41. Error detect circuit 40 compares the signal on line 41 with the signals on lines 37 and 35 to detect an error condition. Circuit 40 also generates a reset command for counter 42. This command is transmitted on line 43 when work head 34 begins a new stroke.

Figure 2:
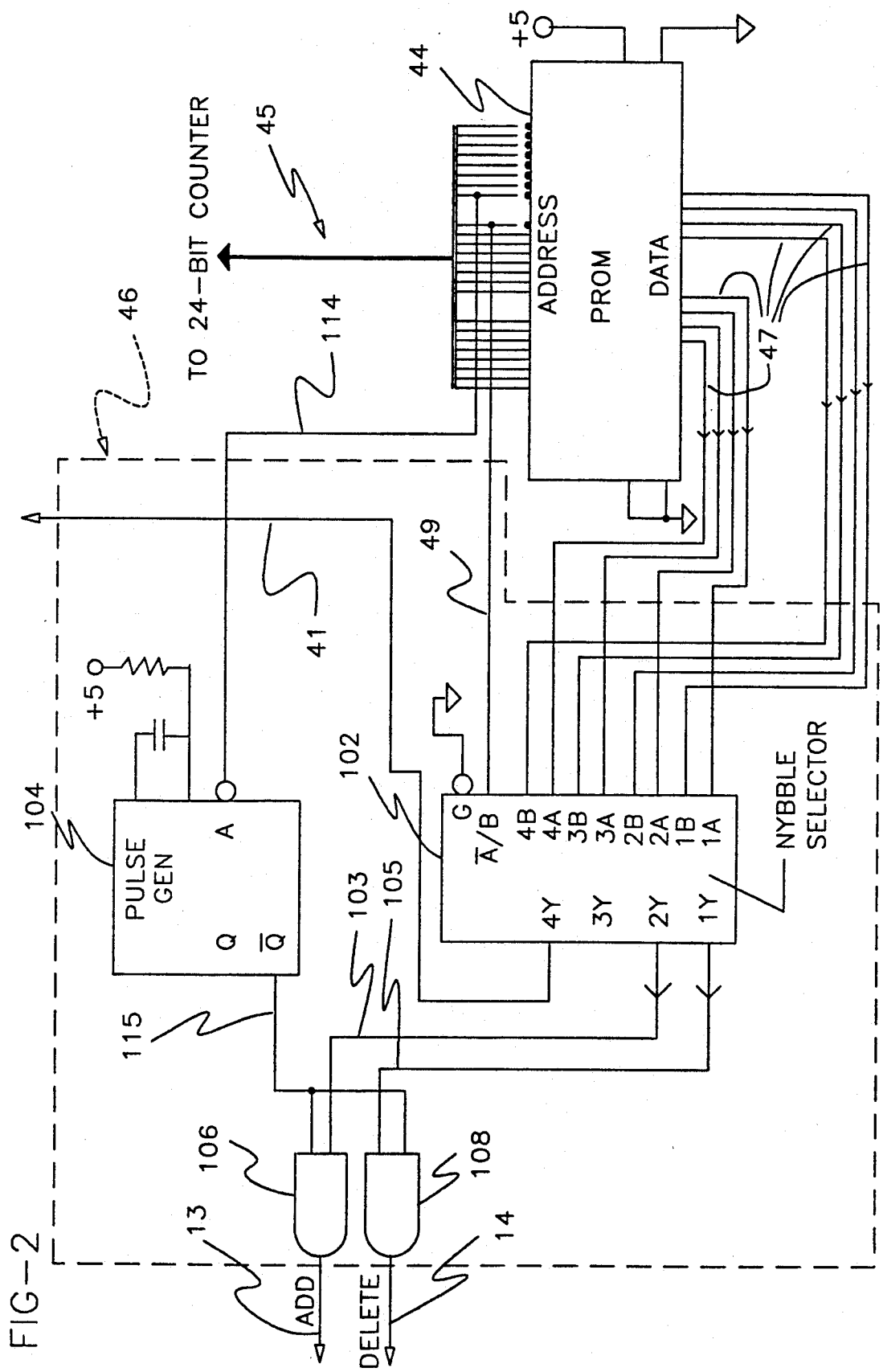
FIG. 2 is a schematic diagram of interconnections between a data selector and a programmable read only memory.

The details of PROM 44 and data select circuit 46 are illustrated in FIG. 2. As noted above, PROM 44 is connected to receive the high order 15 bits from counter 42 via a series of 15 lines 45. The lines 45 function as an address for PROM 44. With each new address on line 45, PROM 44 reads out a new 8-bit code on lines 47. The codes on lines 47 are applied to nybble selector 102 of data select circuit 46.

The eight bits output from PROM 44 are organized into two groups of four bits each. Each group comprises an ADD bit, a DELETE bit, a SYNC bit and a SPARE bit. The ADD bit position goes HI when it becomes time to add a pulse to the raw command signal. The DELETE bit position goes HI when it is time to delete a pulse, and the SYNC bit position goes HI whenever the leadscrew is expected to be at its rotational reference position. The SYNC bit therefore provides a means detecting misregistration between the rotational angle of the leadscrew and the current lookup table address.

As noted above, the correction code from PROM 44 remains fixed for 256 counts of counter 42. This means that only 1 out of 256 pulse intervals within the raw command signal may be modified by pulse processor 12. This is sufficient, however, because it generally requires substantially more than 256 counts to accumulate an error of 1 pulse in the raw command signal. As soon as the system senses an error of that magnitude, the signal on lines 47 is adjusted to indicate a need for an ADD pulse or a DELETE pulse. Accordingly, the work head 34 never has a position error greater than that which can be corrected by the addition or subtraction of one command pulse.

Nybble selector 102 selects the correct 4-bit group on lines 47 and transmits the appropriate ADD or DELETE bits to AND gates 106,108 on lines 103,105 respectively. Decoding is performed by nybble selector 102 by reading line 49 which is connected to receive the ninth bit of the 24-bit address on lines 45. This bit is one bit below the least significant address bit of the PROM. As a result PROM 44 is transformed from an 8-bit storage device into a 4-bit storage device with a doubled number of storage locations.

Pulse generator 104 is connected to line 114 which carries the eighth bit of the 24-bit count from counter 42. A change of the count at this bit position initiates a pulse by pulse generator 104. The pulse is LO going and blocks the passage of ADD pulses through AND gate 106 and DELETE pulses through AND gate 108. The blocking condition continues for a long enough period of time to assure a settling of the data transferred from PROM 44 through nybble selector 102.

Figure 3:
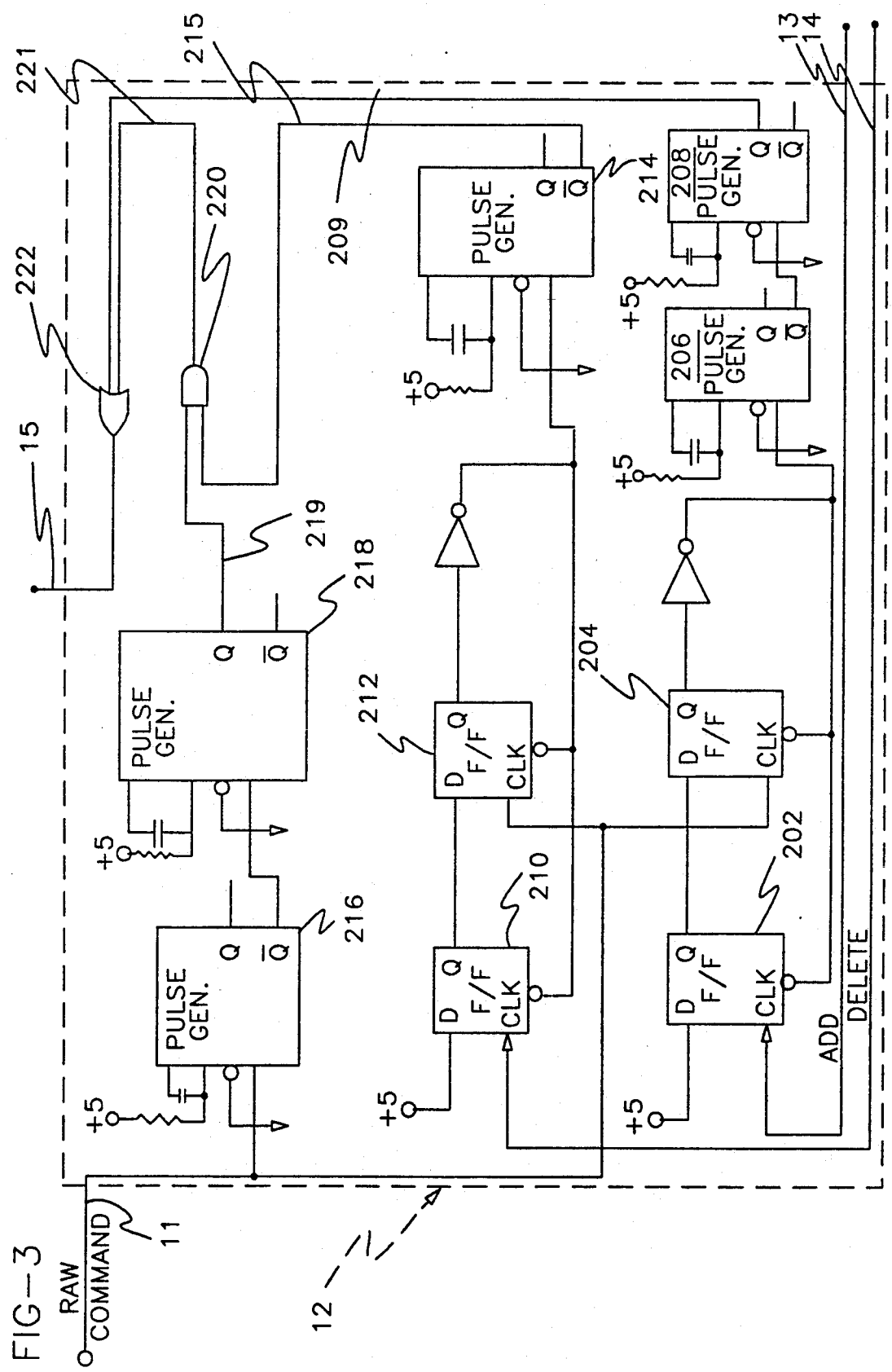
FIG. 3 is a schematic diagram of a pulse processor.

ADD commands from AND gate 106 are provided via line 13 to flip-flop 202 of pulse processor 12, as illustrated in FIG. 3. DELETE commands from AND gate 108 are provided to another flip-flop 210 within pulse processor 12. Pulses on lines 13 and 14 are applied to the clock terminals of flip-flops 202,210 thereby causing latched outputs to another pair of flip-flops 204,212. Raw command pulses on line 11 are applied to the clock terminals of flip-flops 204,212.

When flip-flop 204 receives an output from flip-flop 202, it waits until the next occurrence of a command pulse on line 11 and triggers a pulse from pulse generator 206 which starts a waiting period. At this same time flip-flops 202 and 204 are reset to await the next ADD pulse. At the end of the waiting period, another pulse generator 208 generates the desired ADD pulse. The ADD pulse is transmitted via line 209 to an OR gate 222 which supplies the adjusted command signal to line 15.

The raw command signal is also applied to a pulse generator 216 which in turn is connected to another pulse generator 218. Pulse generator 216 causes a delay, following which, raw command pulses on line 11 are regenerated by pulse generator 218. The regenerated command pulses are applied via line 219 to an AND gate 220 and thence via line 221 to OR gate 222. AND gate 220 is normally enabled by a HI output from a pulse generator 214. However, when pulse generator 214 is triggered, it puts a LO signal on line 215 and temporarily disables AND gate 220 and blocks the regenerated command pulse on line 219.

The input signal to pulse generator 214 is normally HI. When flip-flop 210 receives a DELETE pulse request it enables flip-flop 212. The next command pulse on line 11 sets flip-flop 212, thereby causing the input terminal of pulse generator 214 to go from HI to LO. This triggers pulse generator 214 to generate a blocking pulse for AND gate 220 which in turn deletes a pulse from the string generated on line 219 by pulse generator 218. Flip-flops 210 and 212 are automatically reset by the HI/LO input to pulse generator 214.

Figure 4:
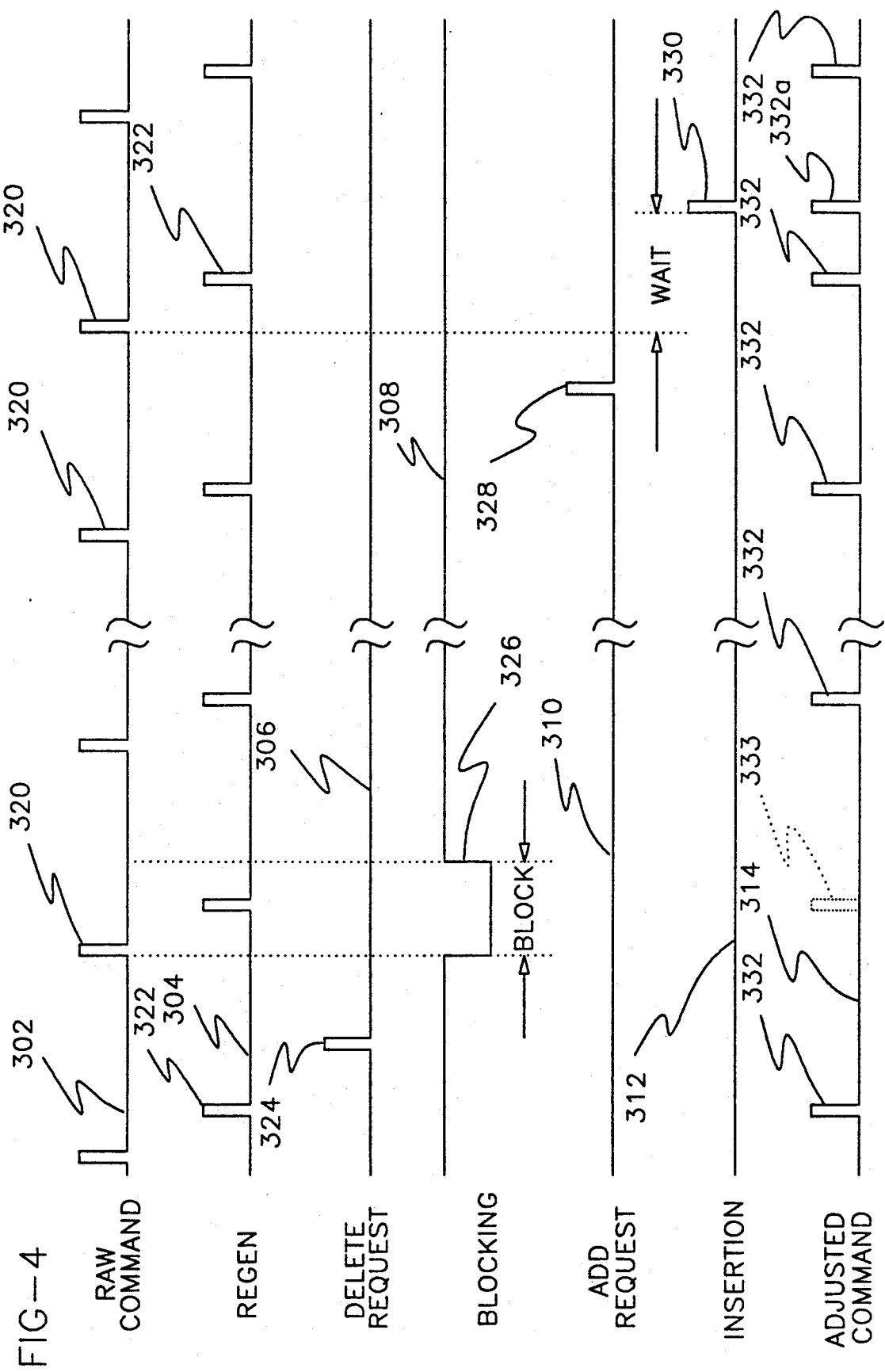
FIG. 4 is a timing diagram for a pulse processor.

A timing diagram which explains the operation of pulse processor 12 is shown in FIG. 4. As illustrated therein, reference numeral 302 represents the raw command signal received by pulse processor 12 on line 11. Reference numerals 320 indicate individual raw command pulses. Line 302 is broken to indicate a time delay of some 256 pulses so as to enable illustration of both an ADD correction and a DELETE correction on one diagram. Line 304 illustrates the output signal from pulse generator 218. Shown on line 304 are a series of pulses 322 which are regenerated and delayed versions of pulses 320.

Line 306 represents the signal on line 14. This signal comprises a DELETE pulse 324. Signal line 308 represents the output from pulse generator 214. This signal has a blocking pulse 326 created in response to pulse 324 of line 306, The signal on input line 13 is illustrated by reference numeral 310. This signal includes an ADD pulse 328. The signal indicated by reference numeral 312 represents the output from pulse generator 208. This output includes a new pulse 330 delayed by a short waiting period from the raw command pulse 320 next following the pulse 328. Line 314 represents the adjusted command signal 314 comprising regenerated pulses 332 and an added pulse 332a. Reference numeral 333 indicates a pulse which has been blocked.

Figure 5:
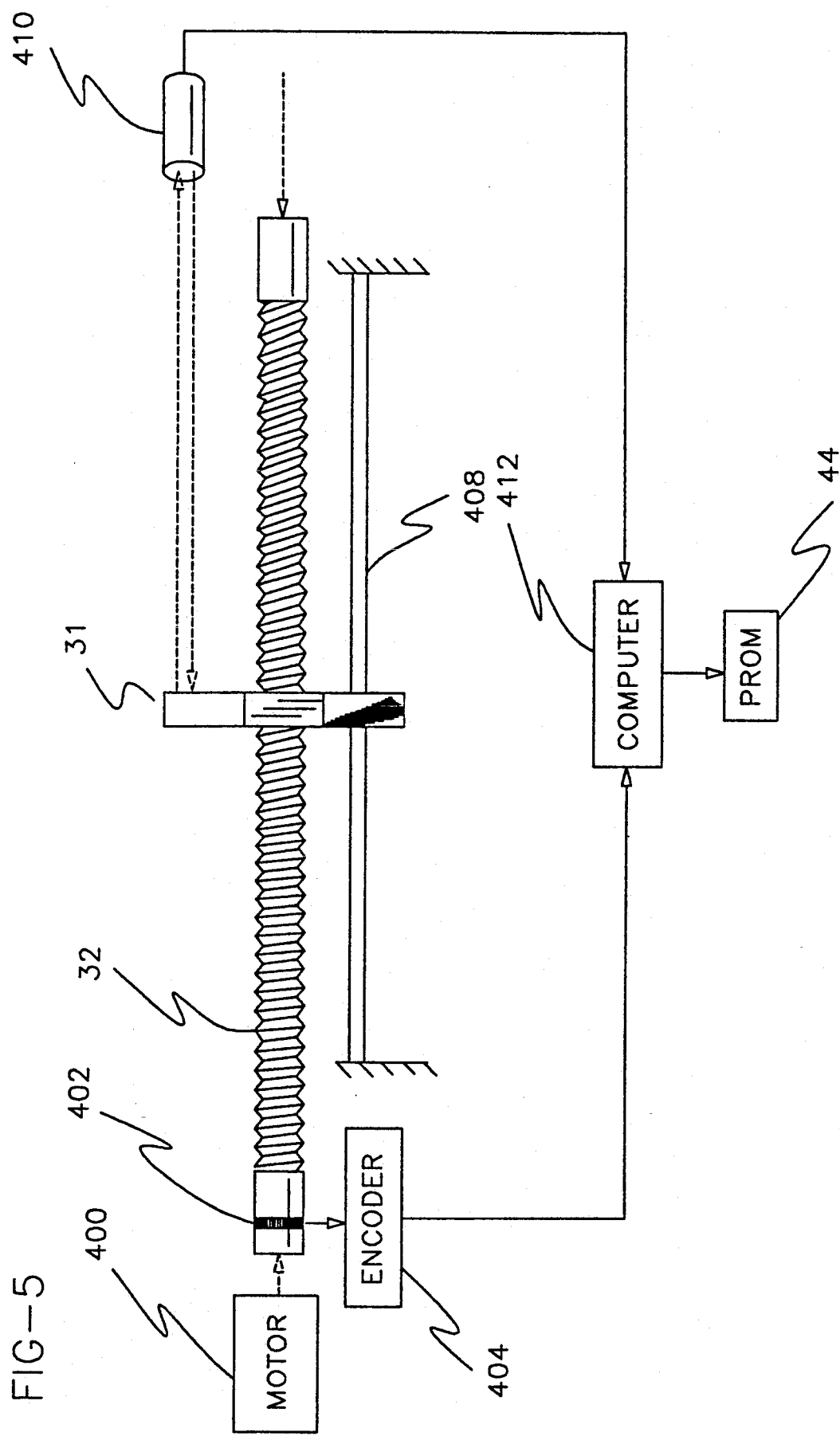
FIG. 5 is a schematic diagram of an arrangement for producing a leadscrew correction table.

FIG. 5 illustrates apparatus for producing PROM 44. As shown therein leadscrew 32 is mounted in a fixture provided with a fixed bar 408. A threaded nut 31 is threaded onto leadscrew 32. Threaded nut 31 also has a slide passage which receives the bar 408, so that nut 31 is fixed against rotation. However, nut 31 is free to move in the axial direction in response to rotation of leadscrew 32.

Leadscrew 32 is rotated by a motor 400. As the leadscrew rotates an encoder 404 observes a series of uniformly positioned markings 402 on the end of leadscrew 32 and generates a series of marking pulses. These pulses are provided to a computer 412 which creates a running total. An interferometer 410 measures the movement of nut 31 and supplies a series of axial position measurements to computer 412. Computer 412 reads the interferometer measurements in synchronism with the pulses from encoder 404 and compares the measured positions with corresponding values thereof which would be produced by a perfect, error-free leadscrew. These differences are tabulated and saved by computer 412.

After the difference table has been prepared, computer 412 prepares a corresponding correction table comprising tabulated increments and decrements. The increments and decrements are arranged in such a manner that their running total is equal to the values of the differences listed in the corresponding entries in the difference table. Each tabulated increment represents a command to ADD a pulse to the leadscrew driving signal, and each tabulated decrement represents a command to DELETE a pulse. This correction table, including SYNC entries and SPARE entries, is loaded into PROM 44 as a function of the 24-bit measured net rotational position.

The use of the PROM with its correction table enables a relaxation in the precision specifications for the leadscrew. It is possible to use a lower quality/lower cost leadscrew to do the same job. Alternatively, it is possible to obtain a higher quality job with the best available leadscrew.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. Apparatus for driving a leadscrew comprising:
   means for receiving a raw command signal in the form of a sequence of command pulses indicating a sequence of commanded incremental changes in the net rotational position of said leadscrew,
   a pulse processor connected for receiving incremental correction signals related to pitch errors in said leadscrew and causing corresponding adjustment of said sequence of command pulses,
   a drive motor connected for receiving said sequence of command pulses, adjusted as aforesaid, and rotating said leadscrew in correspondence therewith,
   a position counter for generating a position count corresponding to the commanded rotational position of said leadscrew, and
   memory means connected for addressing by said position count and responding thereto by reading out said incremental correction signals.

2. In an engraving apparatus comprising first motor means for rotating a cylindrical workpiece about the cylindrical axis thereof, an engraving head for engraving the surface of said workpiece during rotation thereof, threaded support means for maintaining said engraving head in contact with said surface, a leadscrew extending in a direction parallel to said cylindrical axis and threadably engaging said threaded support means, second motor means responsive to a sequence of incremental command pulses for rotating said leadscrew to cause translation of said engraving head in said direction, a command generator for generating a sequence of input pulses in synchronism with the rotation of said workpiece, and control means for processing said input pulses and generating said incremental command pulses in correspondence therewith; the improvement wherein said control means comprises:
   (a) a position counter for generating a position count corresponding to a commanded rotational position of said leadscrew,
   (b) memory means connected for addressing by said position count and responding thereto by reading out incremental correction signals related to pitch errors in said leadscrew, and
   (c) a pulse processor connected for receiving said input pulses and said incremental correction signals and configured for producing said incremental command pulses in a sequence corresponding to the sequence of said input pulses but adjusted in accordance with said correction signals.

3. In an engraving apparatus comprising first motor means for rotating a cylindrical workpiece about the cylindrical axis thereof, an engraving head for engraving the surface of said workpiece during rotation thereof, threaded support means for maintaining said engraving head in contact with said surface, a leadscrew extending in a direction parallel to said cylindrical axis and threadably engaging said threaded support means, second motor means responsive to a sequence of incremental command pulses for rotating said leadscrew to cause translation of said engraving head in said direction, a command generator for generating a sequence of input pulses in synchronism with the rotation of said workpiece, and control means for processing said input pulses and generating said incremental command pulses in correspondence therewith; the improvement wherein said control means comprises:
   shaft angle encoding means for generating a sequence of feedback pulses in synchronism with rotational motion of said leadscrew,
   velocity feedback means for generating a velocity feedback signal indicating the rotational speed of said leadscrew,
   a difference counter for receiving said incremental command pulses and said feedback pulses, counting the difference therebetween, and generating a corresponding difference count signal,
   a velocity error generator for generating a velocity error signal corresponding to a difference between said difference count signal and said velocity feedback signal,
   a position counter for generating a position count corresponding to the net rotational position of said leadscrew, memory means connected for addressing by said position count and responsive thereto by reading out incremental corrections related to pitch errors in said leadscrew, and a pulse processor connected for receiving said incremental corrections and causing corresponding incremental adjustments of said difference count signal.

4. The improvement of claim 3 wherein said position counter is connected for generating said position count by counting said input pulses.

5. In an engraving apparatus comprising first motor means for rotating a cylindrical workpiece about the cylindrical axis thereof, an engraving head for engraving the surface of said workpiece during rotation thereof, threaded support means for maintaining said engraving head in contact with said surface, a leadscrew extending in a direction parallel to said cylindrical axis and threadably engaging said threaded support means, second motor means responsive to a sequence of incremental command pulses for rotating said leadscrew to cause translation of said engraving head in said direction, a command generator for generating a sequence of input pulses in synchronism with the rotation of said workpiece, and control means for processing said input pulses and generating said incremental command pulses in correspondence therewith; the improvement wherein said control means comprises:

shaft angle encoding means for generating a sequence of feedback pulses in synchronism with rotational motion of said leadscrew, a difference counter for receiving said incremental command pulses and said feedback pulses, counting the difference therebetween, and generating a corresponding difference count signal, a position counter for generating a position count corresponding to the net rotational position of said leadscrew, memory means connected for addressing by said position count and responsive thereto by reading out incremental corrections related to pitch errors in said leadscrew, and a pulse processor connected for receiving said incremental corrections and causing corresponding incremental adjustments of said difference count signal.

6. The improvement of claim 5 wherein said pulse processor comprises:

means for generating one of said incremental command pulses corresponding to each of said input pulses, means for generating additional ones of said incremental command pulses when said incremental corrections are of a first predetermined type, and means for blocking selected ones of said incremental command pulses when said incremental corrections are of a predetermined second type different from said first type.

7. The improvement of claim 6 wherein said position counter is connected for counting said input pulses.

8. Apparatus for driving a leadscrew comprising:

means for receiving a raw command signal in the form of a sequence of command pulses indicating a sequence of commanded incremental changes in the net rotational position of said leadscrew, shaft angle encoding means for generating a sequence of feedback pulses in synchronism with rotational motion of said leadscrew, velocity feedback means for generating a velocity feedback signal indicating the rotational speed of said leadscrew, a difference counter for receiving said command pulses and said feedback pulses, counting the difference therebetween, and generating a corresponding difference count signal, a velocity error generator for generating a velocity error signal corresponding to a difference between said difference count signal and said velocity feedback signal, a drive motor connected for receiving said velocity error signal and rotating said leadscrew in correspondence therewith, a position counter for generating a position count corresponding to the net rotational position of said leadscrew, memory means connected for addressing by said position count and responsive thereto by reading out incremental corrections related to pitch errors in said leadscrew, and a pulse processor connected for receiving said incremental corrections and causing corresponding incremental adjustments of said difference count signal.

9. Apparatus according to claim 8 wherein said position counter is connected for generating said position count by counting said command pulses.

10. Apparatus according to claim 9 wherein said pulse processor is connected for incrementally adjusting said raw command signal to produce consequent incremental adjustment of said difference count signal.

11. Apparatus according to claim 10 wherein said pulse processor comprises means for selectively adding pulses to said raw command signal and deleting pulses therefrom in response to said incremental corrections.

12. Apparatus according to claim 11 wherein said memory means comprises means for generating positive type and negative type correction pulses corresponding respectively to negative type and positive type pitch errors of said leadscrew, and said pulse processor comprises means for inserting a command pulse into said raw command signal upon reception of a positive type correction pulse and means for deleting a command pulse from said raw command signal upon reception of a negative type correction pulse.

13. Apparatus according to claim 12 further comprising a digital-to-analog converter for converting said difference count signal to an analog form and supplying said difference count signal in analog form to said velocity error generator.

14. Apparatus for driving a leadscrew comprising:

means for receiving a raw command signal in the form of a sequence of command pulses indicating a sequence of commanded incremental changes in the net rotational position of said leadscrew, shaft angle encoding means for generating a sequence of feedback pulses in synchronism with rotational motion of said leadscrew, a position counter connected for counting said command pulses and generating a position count indicating the net rotational position of said leadscrew, memory means connected for addressing by said position count and responsive thereto by reading out incremental ADD corrections and incremental DELETE corrections related to pitch errors in said leadscrew, a pulse processor connected for selectively adding command pulses to said raw command signal in response to said ADD corrections and selectively deleting command pulses from said raw command signal in response to said DELETE corrections, a difference counter for receiving said command pulses and said feedback pulses, counting the difference therebetween, and generating a corresponding difference count signal, and a drive motor connected for rotating said leadscrew in correspondence with said difference count signal.

15. Apparatus according to claim 14 further comprising:

velocity feedback means for generating a velocity feedback signal indicating the rotational speed of said leadscrew, and a velocity error generator for generating a velocity error signal corresponding to a difference between said difference count signal and said velocity feedback signal and supplying said velocity error signal to said drive motor.

16. Method of driving a leadscrew comprising the steps of:

(1) measuring the advance of said leadscrew for a series of net angular rotations thereof, (2) for each said measured advance, calculating an associated linearized net angular rotation, (3) tabulating a series of incremental corrections having a running total corresponding to differences between said net angular rotations and the associated linearized net angular rotations, (4) generating an angular position reference signal corresponding to a sequence of desired angular positions of said leadscrew, (5) generating a feedback signal corresponding to a sequence of actual angular positions of said leadscrew, (6) generating a position error signal corresponding to differences between said reference signal and said feedback signal, (7) adjusting said position error signal in accordance with said incremental corrections, and (8) rotating said leadscrew in accordance with adjusted values of said position error signal.

17. Method according to claim 16 and comprising the further steps of:

(9) generating a rate signal corresponding to the angular rotation rate of said leadscrew, and

(10) subtracting said rate signal from said position error signal.

* * * * *